(12) United States Patent
Ebersole, Jr. et al.

(10) Patent No.: US 7,046,214 B2
(45) Date of Patent: May 16, 2006

(54) METHOD AND SYSTEM FOR ACCOMPLISHING A SCALABLE, MULTI-USER, EXTENDED RANGE, DISTRIBUTED, AUGMENTED REALITY ENVIRONMENT

(75) Inventors: John Franklin Ebersole, Jr., Bedford, NH (US); Andrew Wesley Hobgood, Nashua, NH (US); John Franklin Ebersole, Bedford, NH (US)

(73) Assignee: Information Decision Technologies, LLC, Bedford, NH (US)

(*) Notice: Subject to any disclaimer, the term of this patent is extended or adjusted under 35 U.S.C. 154(b) by 0 days.

(21) Appl. No.: 11/092,083

(22) Filed: Mar. 29, 2005

(65) Prior Publication Data

US 2005/0168403 A1   Aug. 4, 2005

Related U.S. Application Data

(63) Continuation-in-part of application No. 10/739,575, filed on Dec. 17, 2003, and a continuation-in-part of application No. 11/027,046, filed on Dec. 31, 2004.

(60) Provisional application No. 60/607,310, filed on Sep. 3, 2004, provisional application No. 60/640,982, filed on Jan. 3, 2005.

(51) Int. Cl.
*G09G 5/00* (2006.01)

(52) U.S. Cl. .............................. 345/7; 345/8

(58) Field of Classification Search .................. 345/7, 345/8, 9, 145, 146, 157, 340–341, 348, 421, 345/419, 473; 434/226, 307
See application file for complete search history.

(56) References Cited

U.S. PATENT DOCUMENTS

| | | | |
|---|---|---|---|
| 6,625,299 B1* | 9/2003 | Meisner et al. | 382/103 |
| 6,919,867 B1* | 7/2005 | Sauer | 345/8 |
| 2004/0189675 A1* | 9/2004 | Pretlove et al. | 345/633 |
| 2005/0008256 A1* | 1/2005 | Uchiyama et al. | 382/291 |
| 2005/0275664 A1* | 12/2005 | Hobgood et al. | 345/633 |

* cited by examiner

*Primary Examiner*—Vijay Shankar
*Assistant Examiner*—Nitin Patel
(74) *Attorney, Agent, or Firm*—Brian M. Dingman, Esq.; Mirick, O'Connell, DeMallie & Lougee

(57) ABSTRACT

A wireless or extra-long-tethered augmented reality (AR) system and method, where the user wears some or all of the equipment necessary to perform the simulation. Various arrangements are presented that can be selected based on the needs of the system, such as the number of users and type of tracking equipment. Most of the discussion is optimized to a firefighter training system, but the disclosure is applicable to most any other application of wireless AR.

18 Claims, 14 Drawing Sheets

METHOD AND SYSTEM FOR ACCOMPLISHING A SCALABLE, MULTI-USER, EXTENDED RANGE, DISTRIBUTED, AUGMENTED REALITY ENVIRONMENT

CROSS REFERENCE TO RELATED APPLICATIONS

This application claims priority of Provisional patent applications 60/607,310 filed Sep. 3, 2004, and 60/640,982 filed Jan. 3, 2005. This application is a Continuation in Part of "Advanced Ruggedized Augmented Reality Instrumented Self Contained Breathing Apparatus," Ser. No. 10/739,575 filed Dec. 17, 2003, and of "Impact-Protected Advanced Ruggedized Augmented Reality Instrumented Self Contained Breathing Apparatus," Ser. No. 11/027,046 filed Dec. 31, 2004.

FIELD OF THE INVENTION

This invention relates to wireless (or extra-long-tethered) augmented reality, with optimizations towards firefighter training systems.

COPYRIGHT INFORMATION

A portion of the disclosure of this patent document contains material that is subject to copyright protection. The copyright owner has no objection to the facsimile reproduction by anyone of the patent document or the patent disclosure as it appears in the Patent and Trademark Office records but otherwise reserves all copyright works whatsoever.

BACKGROUND OF THE INVENTION

FIG. 1 (prior art) shows the major hardware required for each user of a distributed augmented reality system. The one exception is the motion tracker controller 10, which is shared among all users. Thus, rack of equipment 16, does not indicate all equipment used in the rack, however, it does show all equipment used by a single user.

The user has no backpack-worn items. Enclosures 6 and 4 that contain the controller circuitry for the HMD (Head Mounted Display) 2 and miniature camera 1, respectively, are on the main rack 16. Because these controllers are located on main rack 16, custom cables 11 and 12 must be run from the head-worn camera 1 and motion tracker 3 to control boxes 4 and 6. Depending on the manufacturer, and the specific design of the electronics, these cables are limited in length.

The length limitations of the prior art system, based on the manufacturer's specifications, are:

Virtual Research V6 HMD cable 12: 25 feet
Panasonic camera cable 11: 10 meters (~33 feet)
InterSense IS900 tracker RJ-45 ethernet-type cable 13: >50–75 feet

SUMMARY OF THE INVENTION

Most of the discussion regarding this invention is optimized to an AR firefighter training system, but the invention is applicable to most any other application of wireless AR.

It is desirable to increase the cable length in order to extend the useful range of the system. A wireless version allows more freedom of movement. Both options require a system with some of the components carried by the user, preferably in a backpack-worn system.

The invention consists of several enhancements over the prior art. The prior art system consists of a firefighter training system with a relatively short (~24 feet) tether from the head-worn SCBA to the main rack system, which contains the computational equipment that creates the augmented reality scene controlled by the trainer. The invention describes many different arrangements to either (1) substantially increase the length of the tether by using a relatively small backpack, or (2) eliminate the tether entirely and use a wireless system at the expense of a larger backpack. The proper choice of the various arrangements depend on a tradeoff of weight, size, bandwidth requirements, and hardware/software design, particularly the choice of hardware video mixing versus video-capture on a PC and software-based video mixing on the PC.

This invention features a method for accomplishing a scalable, multi-user, extended range, distributed, augmented reality environment, comprising providing a head-worn display unit, providing a computer system and video hardware worn by the user, providing a data communications system worn by the user to permit the computer to communicate with other computer systems, providing motion tracking hardware worn by the user, using the motion tracking hardware to determine the position and orientation of the user's viewpoint, using the data communications system to send or receive current user position, simulation modification command made by users or instructors, and computer-driven simulation status to other systems participating in the environment, using the computer system to simulate a synthetic environment comprising graphical elements, using the computer system and video hardware to render the graphical elements corresponding to the user's viewpoint, and creating for the user a mixed view comprised of an actual view of the real world as it appears from the user's viewpoint, where graphical elements can be placed any place in the real world and remain anchored to that place in the real world regardless of the direction in which the user is looking, wherein the rendered graphical elements are superimposed on the actual view, to accomplish an augmented reality view of the simulated environment.

The environment may be a firefighter training environment, and a simulated fire may be extinguished by the user, comprising specifying that the environment be a firefighter training environment, providing a physical device that the user can operate to simulate applying extinguishing agent, the device carried by the user during firefighter training, providing motion tracking hardware attached to the extinguishing agent application device, using the motion tracking hardware that is attached to the extinguishing agent application device to determine the position and orientation of the extinguishing agent application device, determining the operating state of the extinguishing agent application device, transmitting the position, orientation, and operating state of the extinguishing agent application device to other systems participating in the firefighting environment, and using the position, orientation, and operating state of the extinguishing agent application device to generate graphical elements comprising simulated application of an extinguishing agent, showing the extinguishing agent itself emanating directly from the extinguishing agent application device, and showing the interaction and extinguishing of fire with the agent.

The extinguishing agent application device may be selected from the group consisting of a water nozzle, AFFF nozzle, PKP extinguisher, CO2 extinguisher, and AFFF extinguisher. The extinguishing agent application device may be operated wirelessly.

The environment may be a police or military training environment, comprising specifying that the environment be a military-style training environment, providing a physical device that the user can operate that simulates the functionality of a gun, which is carried by the user during training, providing motion tracking hardware attached to the physical device, using the motion tracking hardware that is attached to the physical device to determine the position and orientation of the device, determining the operating state of the device, transmitting the position, orientation, and operating state of the device to other systems participating in the environment, and using the position, orientation, and operating state of the device to generate graphical elements comprising simulated gunfire, and showing the results of the gunfire on elements in the simulation.

A tether may be used to connect at least some of the user-worn equipment to a remotely-mounted set of equipment to provide at least one of power and data to the user-worn equipment. At least one battery may be carried by the user, to provide power for at least some of the other equipment carried by the user. The power used by the various user-worn items may be generated on the user, from a single power source provided over a tether connected between the user-worn items and a remote location. At least one power supply may create at least one voltage output.

The unit may be operated wirelessly, and have no tether. The equipment worn by the user may transmit tracking data and video data to a remote location, and the necessary computer-generated imagery may be created and mixed with the video data at the remote location, and then the mixed augmented reality video may be transmitted back to the equipment worn by the user for display to the user. The equipment worn by the user may transmit tracking data to a remote location, and the necessary computer-generated imagery may be produced at the remote location and then transmitted back to the equipment worn by the user, and the equipment worn by the user may mix the computer-generated imagery with the video created by the video hardware worn by the user, thus generating the finished augmented reality video for display to the user.

The equipment worn by the user may transmit tracking data to a remote location, and tracking position data may be computed at the remote location and then transmitted to the equipment worn by the user, and the equipment worn by the user may produce the necessary computer-generated imagery, and mix the computer-generated imagery with the video created by the video hardware worn by the user, thus generating the finished augmented reality video for display to the user. The video created by the video hardware worn by the user may be captured by the computer worn by the user, and then the computer may mix the computer-generated imagery with the video. The equipment worn by the user may perform all necessary processing of video data and tracking data, without the assistance of any remote computer hardware. Software-based video mixing may be performed, where the computer captures a video stream, renders computer-generated simulation components, mixes them with the video stream, and then outputs the completed augmented reality video stream.

Also featured is a method of tracking a user, in which equipment worn by a user performs user-tracking processing, comprising providing active motion tracking hardware installed in the environment, providing motion tracking hardware worn by the user which is able to receive signals from the active motion tracking hardware installed in the environment, and those signals contain information about the relative position of the motion tracking hardware worn by the user in relation to the active motion tracking hardware installed in the environment, providing motion tracking data processing hardware worn by the user which processes the signals received by the motion tracking hardware worn by the user, providing a means for the motion tracking data processing hardware to receive information about the signals of the active motion tracking hardware installed in the environment, where the information at least indicates when the motion tracking hardware installed in the environment is emitting a signal, and using the motion tracking hardware and additional motion tracking data processing hardware to determine the position and orientation of the user's viewpoint in relation to the motion tracking hardware installed in the environment. The means to receive information about the signals of the active motion tracking hardware installed in the environment may be accomplished with a wireless link.

The following descriptions (Arrangements A through G) take more and more of the equipment that normally goes on the main rack 16, and put it onto a backpack/user-worn pack (for simplicity, the term "backpack" will be used to describe one or more packs or other equipment-carrying devices such as harnesses carried on a user's person).

Overview of Data Flow and Software Functions

Refer to FIG. 13 and FIG. 14 for an overview of how augmented reality (AR) may be accomplished in the invention. The following steps are used in all variations of achieving augmented reality that are discussed herein:

1. Obtain a view of the real world (preferably using one or more video cameras), from the point of view of the user wearing the equipment (HMD, video camera, etc.).

2. Obtain the position and orientation of the camera's viewpoint.

3. Render a computer-generated view of scene elements relevant to training or the other current use of the system, from the point of view of the camera's viewpoint, as determined in step 2.

4. Create a mixed view, combining the view of the real world in step 1, with the rendered view made in step 3.

5. Finally, display the final, mixed view to the user on the HMD.

Data Flow and Software Functions Specific to Both Hardware Mixing and Software-Based Mixing First, a video camera 101 captures a video image, which is sent to the camera controller 102, which produces an NTSC video signal 103. The user's computer 100 receives, via the network communication API 110 and network interface 108 (which can be wireless or wired), information from the master computer (not shown) including simulation status and tracking information about where video camera 101 is located. The simulation and viewpoint rendering code 111 renders a view of computer-generated objects and sends it to graphics API 107.

Data Flow and Software Functions Specific Only to Hardware Mixing. (FIG. 13)

This is the preferred embodiment. The graphics API 107 outputs the computer-generated imagery as a VGA signal 116 to a scan converter 116, which then converts the signal to an NTSC signal 117. The video mixer takes the computer generated NTSC signal 117 and mixes it with the NTSC video signal 103 of the real world to produce a completed NTSC signal 119. NTSC signal 119 is then up-converted via a converter 120 to a VGA signal 112 and sent to the HMD controller 113, which sends the final imagery to the HMD 114, where the user can see a completed AR view of the real world plus computer-generated imagery.

Data Flow and Software Functions Specific Only Software Mixing. (FIG. 14).

This is an alternative embodiment that uses fewer hardware components. The camera 101 view of the real world is on NTSC signal 103, which is captured by a frame grabber 104. Via interface 105, the video capture API 106 captures the video signal from frame grabber 104, and sends it the graphics API 107, where it is made available to the simulation and viewpoint rendering code 111, which renders a completed mixed view (combining both the real world video from NTSC signal 103 and the computer generated view from the simulation and viewpoint rendering code 111) and sends it to the graphics API 107. The graphics API 107 sends the image out as a VGA signal 115A, which contains the final mixed image. The HMD controller 113 sends the final imagery to the HMD controller 114, where the user can see a completed AR view of the real world plus computer-generated imagery.

BRIEF DESCRIPTION OF THE DRAWINGS

Other objects, features and advantages will occur to those skilled in the art from the following description of the preferred embodiments and the accompanying drawings in which.

DETAILED DESCRIPTION OF THE PREFERRED EMBODIMENTS OF THE INVENTION

Figure 1:
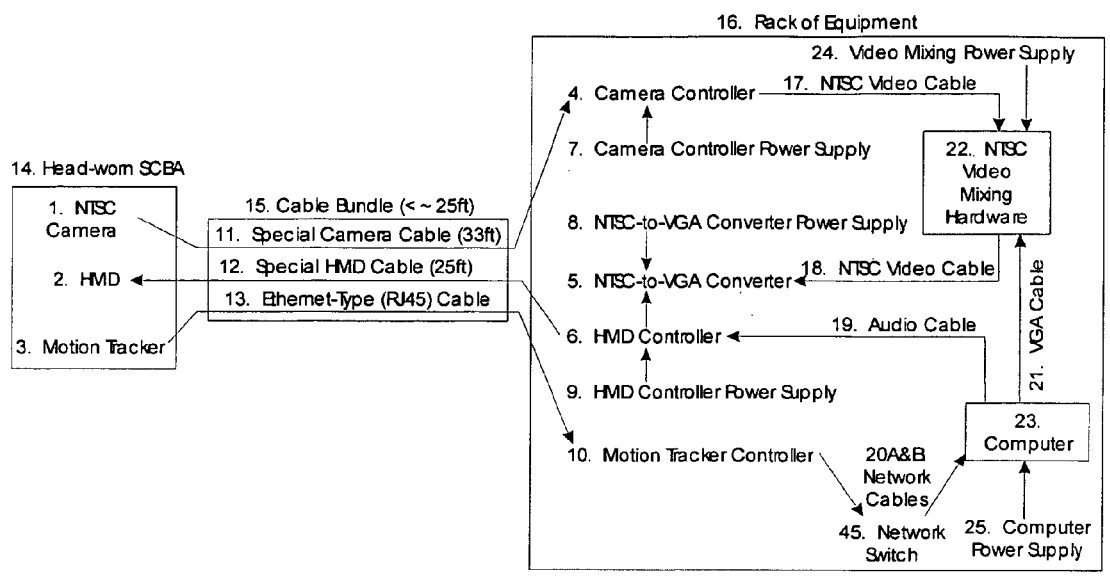
FIG. 1 shows the hardware layout of a prior art system, which has a length-limited (normal) tether, and no backpack because all equipment is on the main rack.
Figure 2:
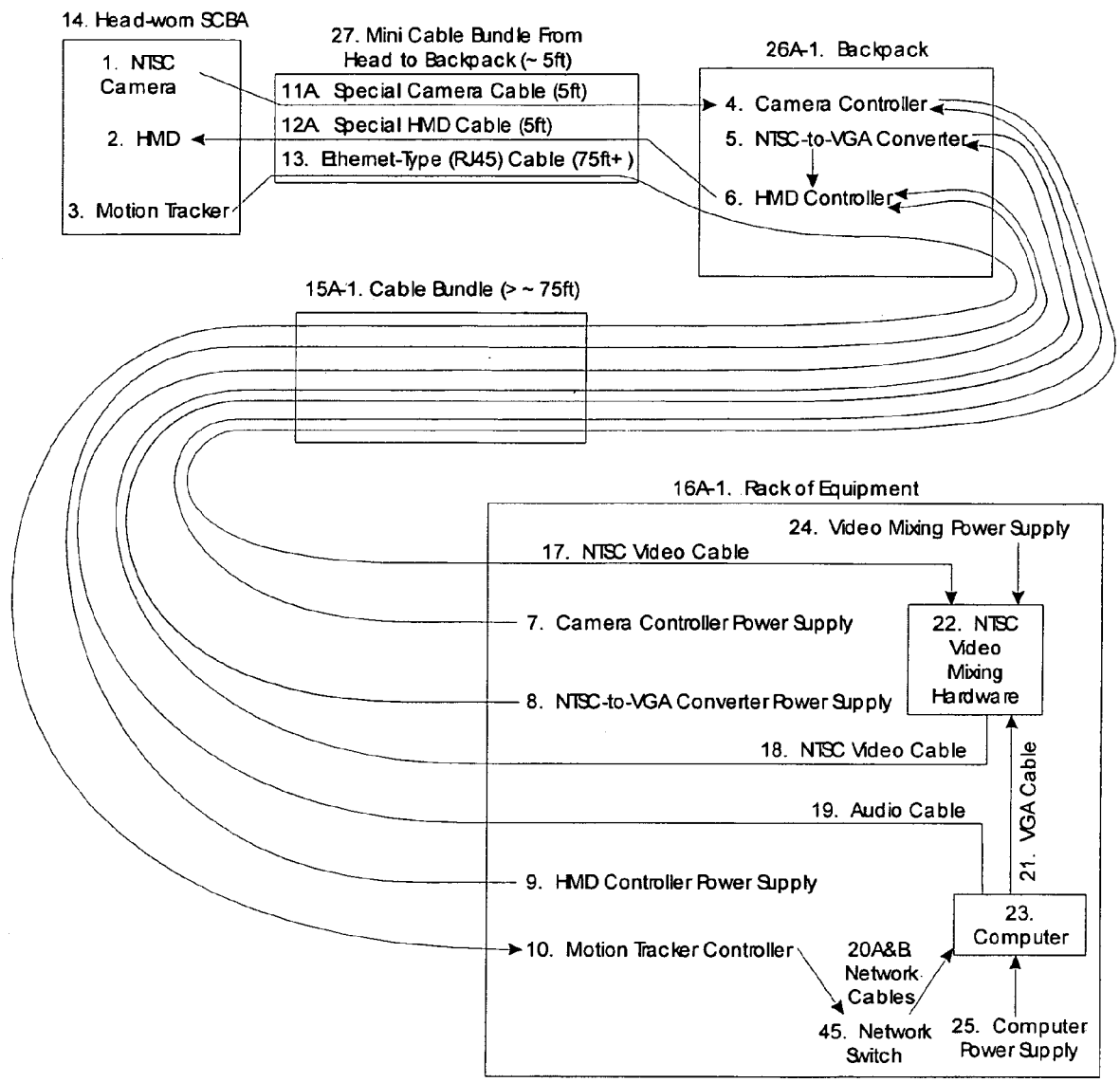
FIG. 2 shows the hardware layout of arrangement A, variant 1 of the invention, with a long-range tether and backpack.
Figure 3:
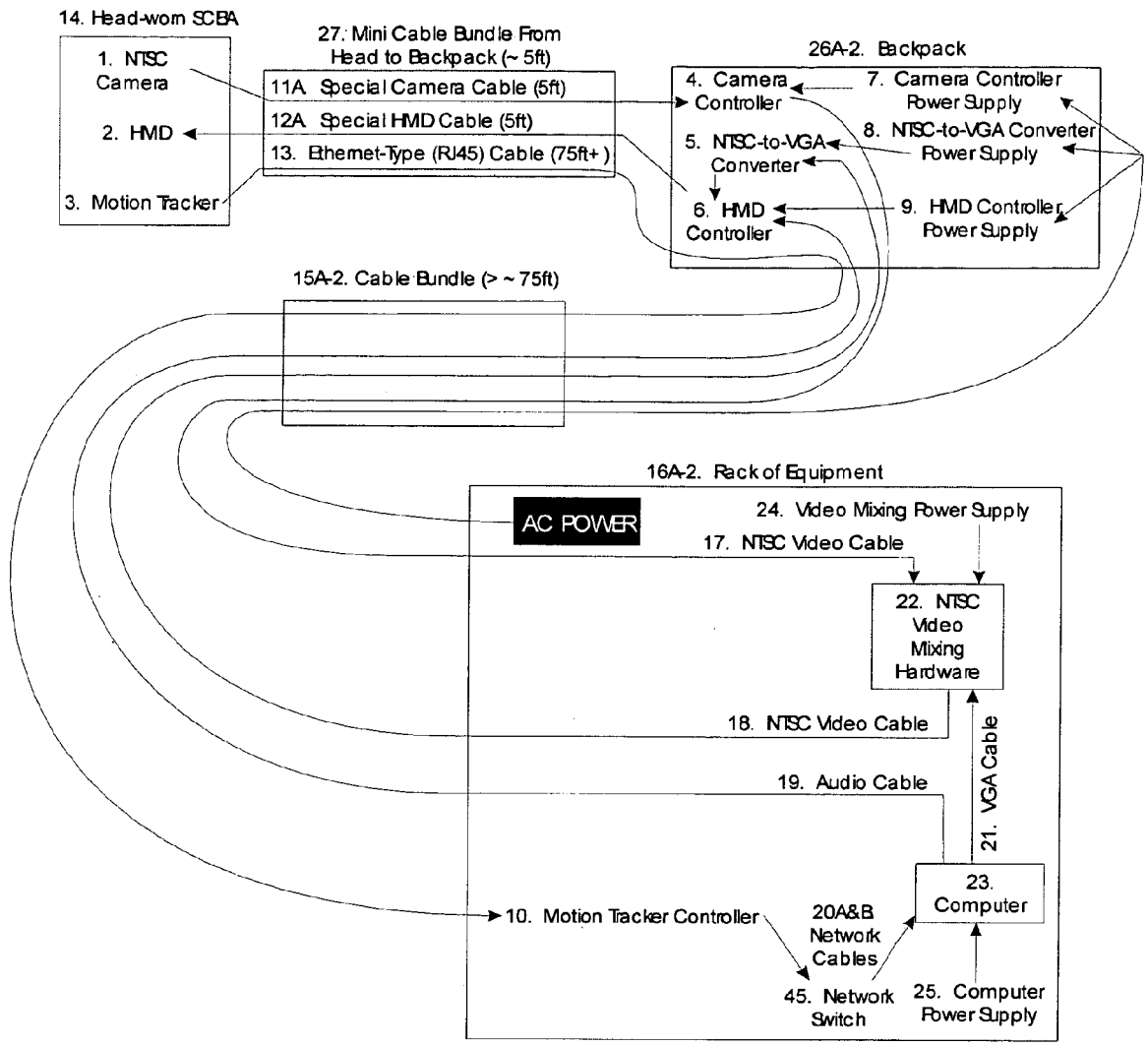
FIG. 3 shows the hardware layout of arrangement A, variant 2 of the invention, with a long-range tether and backpack.
Figure 4:
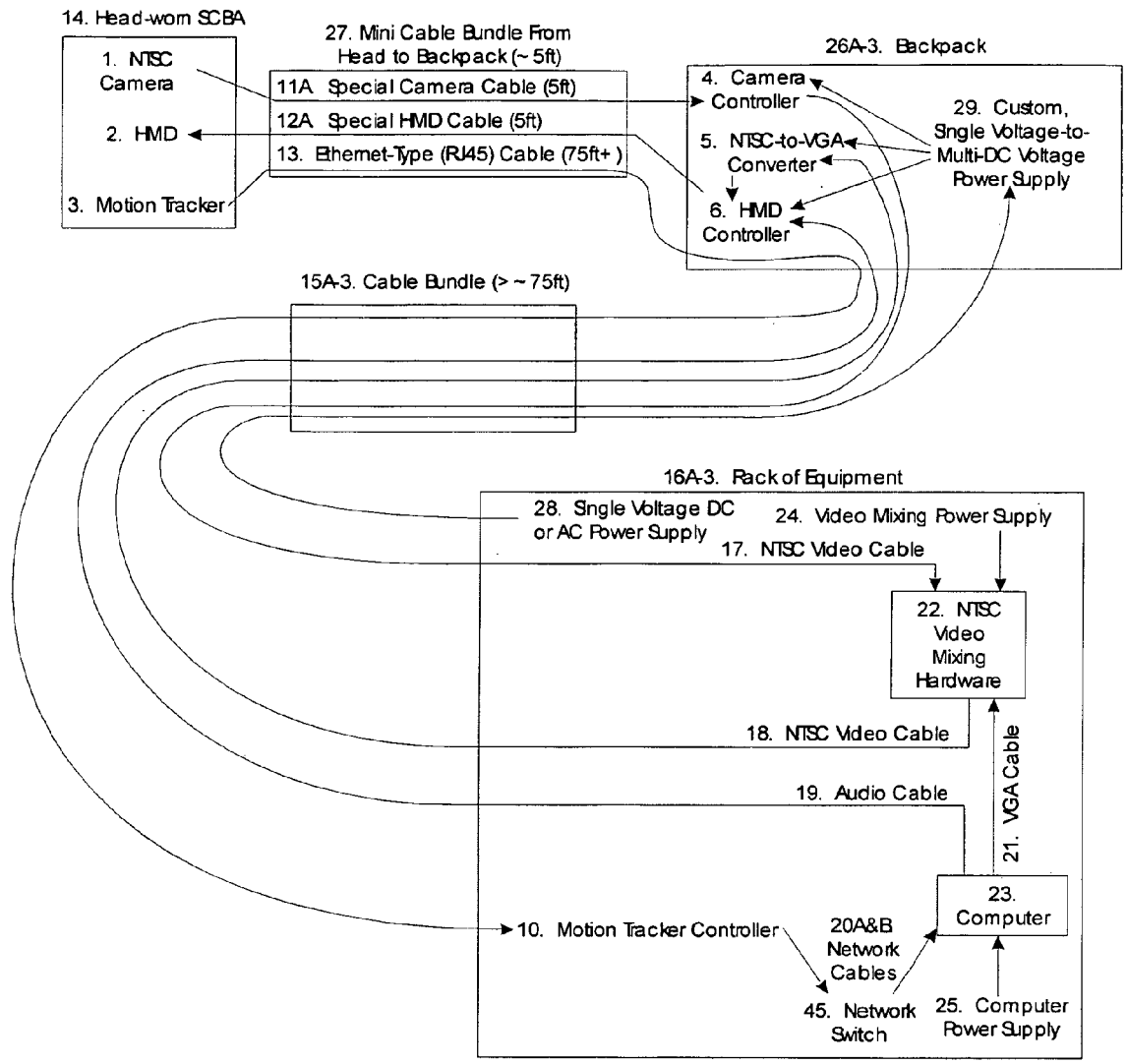
FIG. 4 shows the hardware layout of arrangement A, variant 3 of the invention, with a long-range tether and backpack.

Arrangement A. See FIGS. 2 through 4 for variants A-1, A-2, and A-3.

In contrast to the limited-length tether of the prior art, arrangement A provides a long-range tether, with the same major hardware components as the prior art, but with certain connections and cable lengths modified, with certain components reorganized, and with a minimum amount of items worn on backpack that allows a longer tether, while still using the basic hardware design of the prior art.

While completely wireless operation is considered ideal, for applications that can function tethered, this longer tether option should be considered. Reasons to consider this arrangement rather than the completely wireless option include (a) no batteries required, (b) highest performance tracking and video (since wireless operation cannot improve tracking quality), (c) no concerns with transmissions, (d) no concerns with intermittent wireless connections and noise that may possibly hinder or halt training, and (e) small backpack.

Description of arrangement A, with a probable distance of up to, or exceeding, 75 feet. Refer to FIGS, 2–4. First, put HMD controller 6, NTSC-to-VGA converter 5, and camera controller 4 on a backpack 26A-1. Tether 15A-1 will contain power cables, two NTSC video cables 17, 18 (one out from head-worn camera 1, and one in for HMD 2), and cable 13 for motion tracker 3. Instead of running the length-limited HMD cable 12 in the tether 15A-1 (as was done in the prior art), run an NTSC video cable 18 to the NTSC-to-VGA converter 5, which then runs a 3-inch connector to the HMD controller 6, which then runs a 4–8 foot (as needed) cable 12A to the head unit 14. For the video camera 1, run an NTSC video cable 11A through the cable bundle 27.

To power the devices, there are three main options for the power going through the cable bundle 15A. Variant 1 (bundle 15A-1, see FIG. 2) uses individual pairs of power cables to each item. For example, a simple way to accomplish this would be to extend the cables in each of the power supplies to meet the length requirement. Unfortunately, this creates a large number of wires in bundle 15A-1, and can lead to voltage drop if the length is too long, and if the wires are not of sufficient diameter (wire gauge). The advantage is that this option is simple to design and implement, and does not produce a high voltage hazard, because most voltages typically are 24 VDC or less.

Power Variant 2 (bundle 15A-2, see FIG. 3) uses a single AC power wire pair (120–240 volts depending on the wall outlet voltage) in the cable bundle 15A-2 up to backpack 26A-2, and uses each of power supplies 7, 8, and 9 that come with the individual components, mounted to the backpack. While this can cause a dangerous voltage situation if someone tears or cuts the cable, or gets the unit wet, etc., it is easier to design, and cheaper to build since it does not require custom power supplies.

Power Variant 3 (bundle 15A-3, see FIG. 4) uses a custom power supply 29 that can be made to use only a single voltage, and thus only a single pair of power wires in the bundle 15A-3, and can take either AC or DC voltage, and produce all of the individual voltages required for each unit.

This makes the bundle 15A-3 smaller than 15A-1 and the backpack 26A-3 less complicated, but requires custom power design.

Arrangement B. See FIG. 5.

Wireless backpack 26B uses the same major hardware components as the prior art, but has certain connections modified, with certain components reorganized, and the minimum amount of items worn on backpack 26B while still being wireless, and still using the basic hardware design of the prior art. This arrangement is similar to arrangement A, but makes the wired connections of arrangement A into wireless connections (a "wireless tether" 39B), and has power supplied by a battery 30.

To describe this arrangement, view in contrast to arrangement A. Take the tether 15A, and make the following changes. Change "power cables" into a battery 30 on the backpack 26B and onboard power supply 29. Change the two NTSC video cables 17, 18 (one out from head-worn camera, and one in for HMD) and replace with a commercially available wireless video system 35, 36, 37, and 38 for each link. There exist many options, including 2.4 GHz wireless transmitters/receiver, or UHF/VHF (if the FCC permits) transmitters, just like regular television broadcast channels. Also, a standard capability of the video transmitter is the ability to also transmit the audio from cable 19. Also, change cable 13 for motion tracker to the wireless tracking system offered by the manufacturer, using wireless devices 31 and 32. To make power for all devices, use a DC-DC power supply 29 to convert the battery voltage into the other voltages required by the individual components.

Advantages of this arrangement include minimal lag introduced while still being wireless, lightest weight backpack 26B option, (and conversely most of equipment resides on the main rack 16B, which may not be desirable), the operator/trainer can easily have view of each trainee (since the video is sent back to the main rack 16B), and long battery life due to the small number of backpack-carried components.

A disadvantage may be the need to broadcast video, which requires wide bandwidth signals, and that could be a problem when using many trainees, especially if using a limited bandwidth band like 2.4 GHz. Some of the below arrangements do not broadcast video, which saves on bandwidth used.

Figure 6:
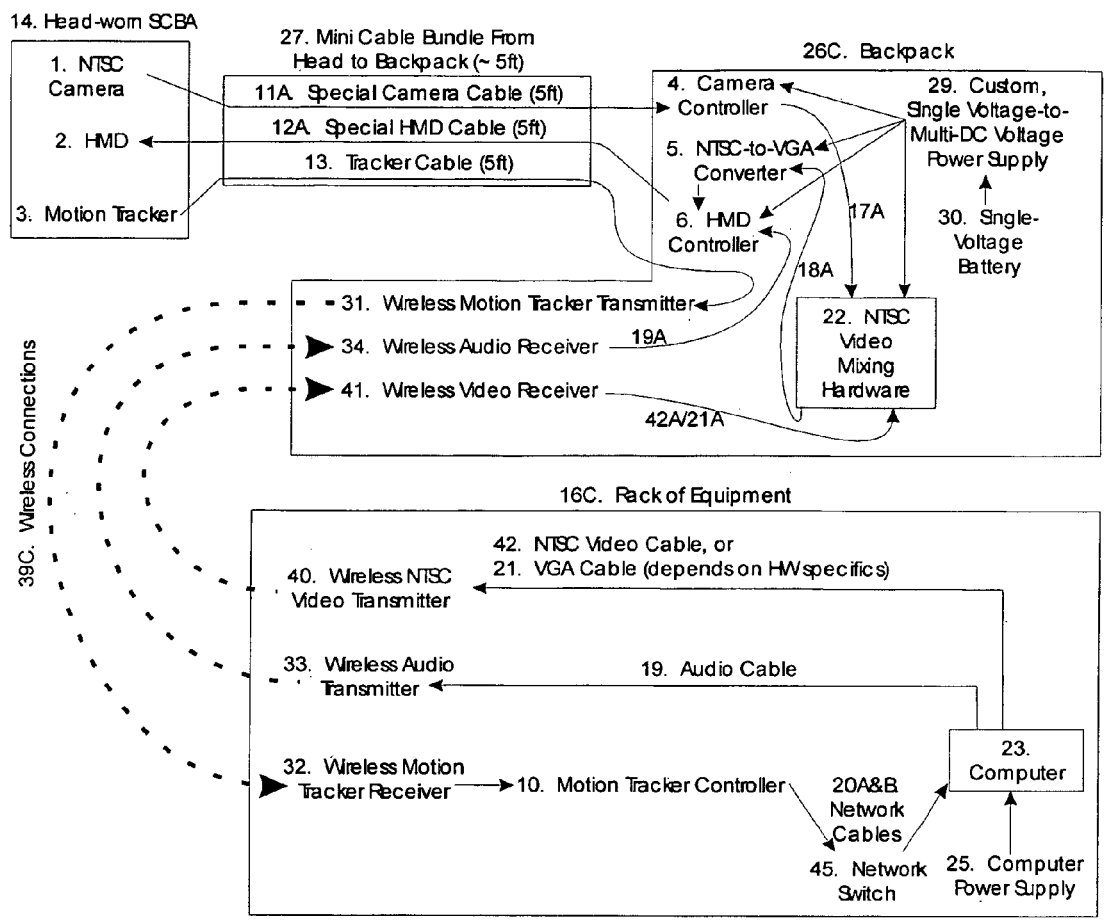
FIG. 6 shows the hardware layout of arrangement C of the invention, with no tether (wireless) and a backpack.

Arrangement C. See FIG. 6.

Wireless backpack 26C uses the same major hardware components as the prior art, but with certain connections modified, with certain components reorganized, and a medium amount of items worn on backpack 26C, while still using the basic hardware design of the prior art.

To describe this arrangement, view in contrast to arrangement B. Take arrangement B described above, and make the below changes.

Put the video mixing hardware 22 onto the backpack 26C. This eliminates the transmission of video via transmitter 37 (in FIG. 5) from the backpack 26C (but retains the transmission of the computer video 42/21 to the backpack 26C). Depending on the specifics of the video mixing hardware 22, this may require additional VGA-to-NTSC and/or NTSC-to-VGA converters. The NTSC video mixing hardware 22 currently used in the prior art takes an NTSC signal from the camera 1, and a VGA signal 21 from the computer 23 and internally converts the VGA 21 to an NTSC signal while at the same time genlocking the output 18A to the camera NTSC video input signal 17A. The camera NTSC signal 17A and the new (internal-only) computer NTSC signal then go into a luminance keyer (which is a sub-component of 22) to perform the mixing. It is probable that a single video mixer could be used to both genlock and perform video mixing (currently those two steps are implemented in the prior art as two separate pieces of equipment), all in the NTSC domain, and that is what is assumed in the diagram for the sake of simplicity, shown as 22.

To summarize, there are two or three wireless connections 39C: wireless motion tracking, one-way wireless video (from the main rack 16C to the backpack 26C), plus a separate wireless audio transmitter 33 (if the audio can't be transmitted together with the video by the video transmitter 40).

The major advantage of this arrangement is that it has one less wireless connection than arrangement B, and therefore less bandwidth is used, and thus more stability. The disadvantages of this arrangement is a bigger backpack 26C, and more power is used.

Figure 7:
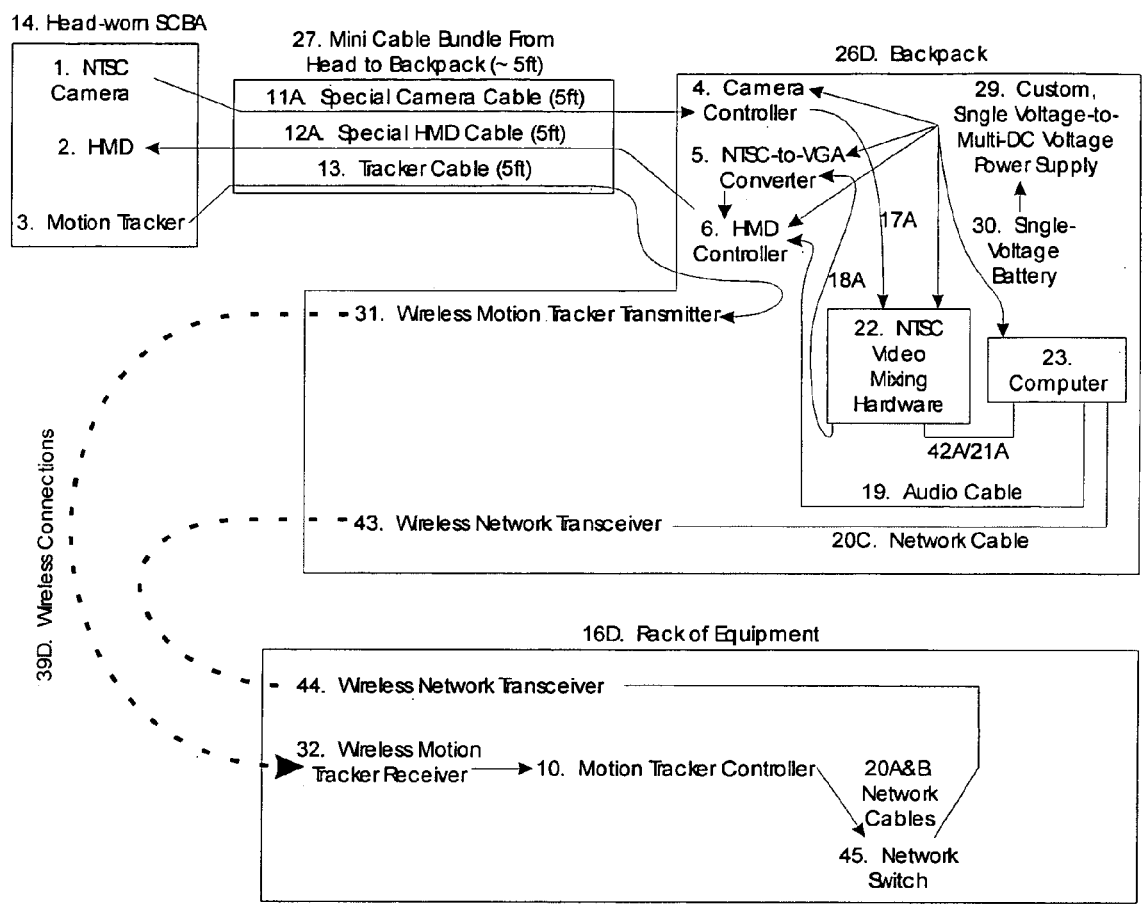
FIG. 7 shows the hardware layout of arrangement D of the invention, with no tether (wireless) and a backpack.

Arrangement D. See FIG. 7.

Wireless backpack 26D uses the same major hardware components as the prior art, but with certain connections modified, with certain components reorganized, and the maximum amount of items worn on backpack, while still using the basic hardware design of the prior art.

To describe this arrangement, view in contrast to arrangement C. Start with arrangement C described above, and put the computer 23 onto the backpack. This eliminates all transmission of video.

Figure 5:
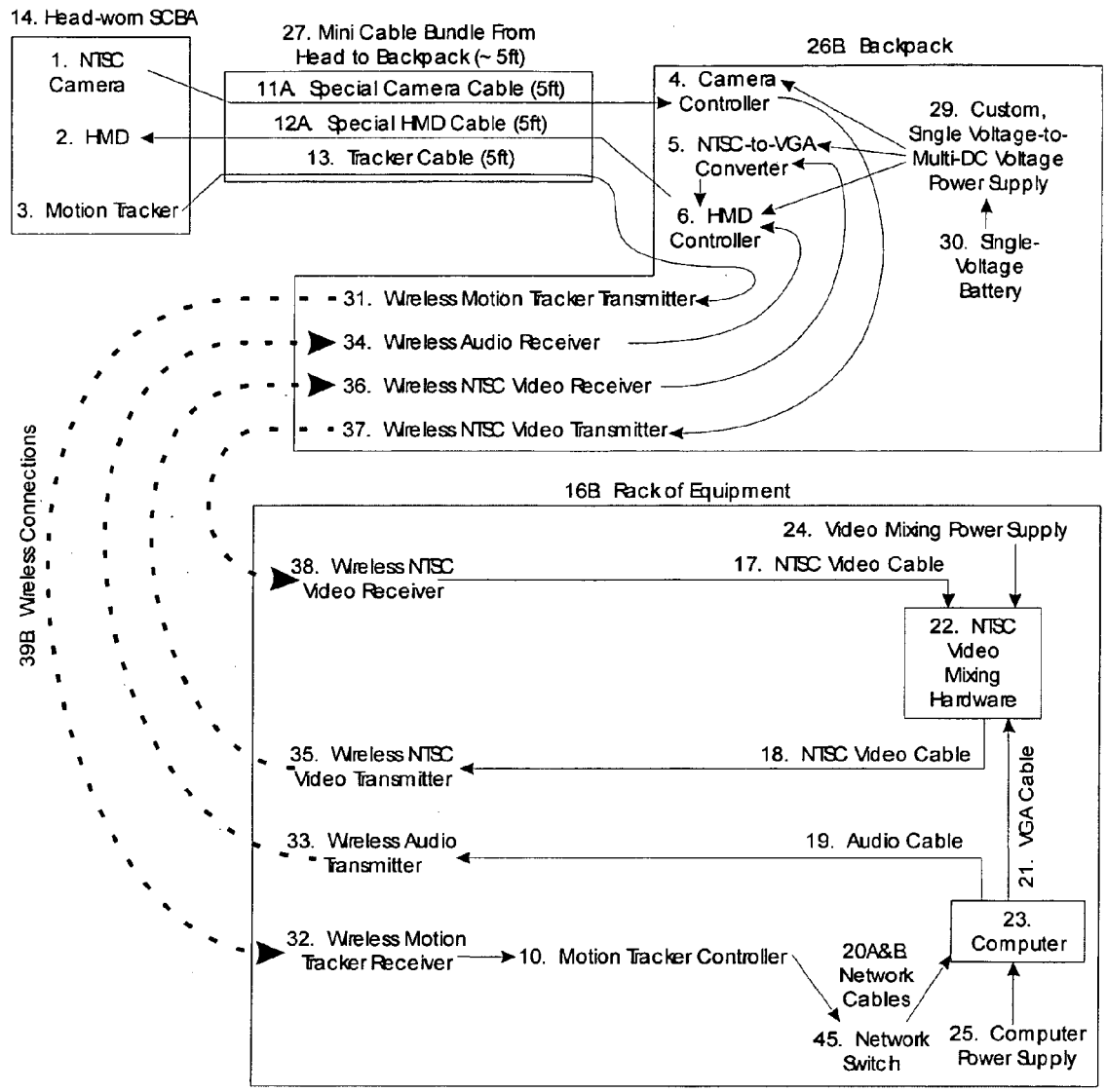
FIG. 5 shows the hardware layout of arrangement B of the invention, with no tether (wireless) and a backpack.

To summarize, there are two wireless connections 39D: wireless motion tracking, and wireless networking. The computer 23 needs the network connection both to receive motion tracking information from the motion tracker controller 10, and for simulation status from the master computer (not shown). An optional capability exists (not shown in FIG. 7) to add the video transmitter 37 and video receiver 38 from arrangement B (FIG. 5). This would allow the instructor operating the rack of equipment 16B to see what each of the trainees are seeing in their head-worn SCBAs 14.

The major advantage of this arrangement is that the system as a whole is completely scalable in terms of the number of users. Adding users, for the most part, only requires adding more backpacks. The arrangement D design does require additional wireless motion tracker receivers 32 to be added to the rack of equipment 16D, one for each additional user, but those are small devices. Another advantage is that it has the minimal amount of wireless transmissions while still using the same basic hardware technologies as the prior art.

The disadvantages of this arrangement are that an even bigger backpack 26D is used than the backpack 26C of arrangement C, and that even more power is required.

Figure 8:
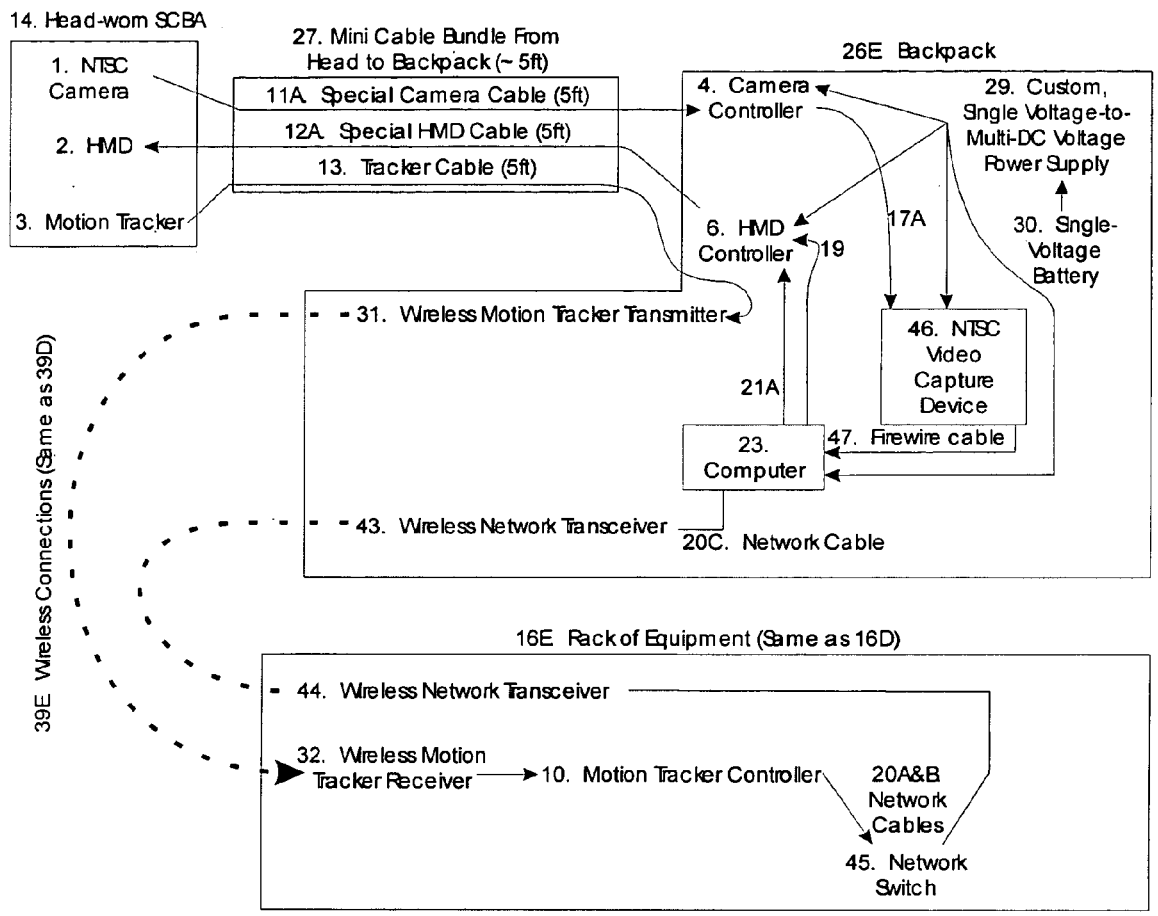
FIG. 8 shows the hardware layout of arrangement E of the invention, with no tether (wireless) and a backpack.

Arrangement E. See FIG. 8.

This arrangement consists of a wireless backpack, using a completely new basic hardware design. Somewhat similar to arrangement D above, as all major hardware is mounted on the backpack 26E, but some basic hardware is changed.

To describe this arrangement, view in contrast to arrangement D. Take arrangement D described above, and make the below changes. Eliminate the NTSC-to-VGA converter 5, and video cable 18A. Plug the VGA cable 21A directly into the HMD controller 6.

Then replace the NTSC video mixing hardware 22 with an NTSC video capture device 46. The NTSC video capture device 46 captures the video image from the camera controller 4, and feeds that image directly into the computer 23. The computer 23 renders the captured video image, internally overlays computer generated imagery onto that captured video image, and outputs the final scene to the VGA cable 21A. Ideally, this is done at the full frame rate of the video signal (i.e., 60 Hz for an NTSC signal). Anything less produces "lag" and "jumping" effects (which can produce very poor results at 15 Hz or less) of the real world as seen by the user.

The main advantage of this arrangement is that it uses less hardware. Additionally, the hardware is less expensive, the backpack can be smaller (the NTSC video capture device 46 is currently about the size of a fist, and replaces the NTSC video mixing hardware 22 [FIG. 7] which currently consists of two much larger boxes, plus it eliminates the NTSC-to-VGA converter 5 [FIG. 7]), less power is used, and the software now has more control in video mixing.

More control in video mixing allows for opaque white objects. The preferred embodiment uses luminance keying, where computer-generated objects that are white are made clear, and black objects are made opaque. Better control is a major advantage, and allows for items like opaque and white steam, water, and foam, which are all very critical simulation components to a firefighter training program.

The main disadvantage is that this arrangement introduces lag. When software is rendering at a slow frame rate (due to a very complicated scene), the real world is also rendered at a slow frame rate, so extra care must be made to ensure that the software will always run at a guaranteed minimum frame rate.

Figure 11:
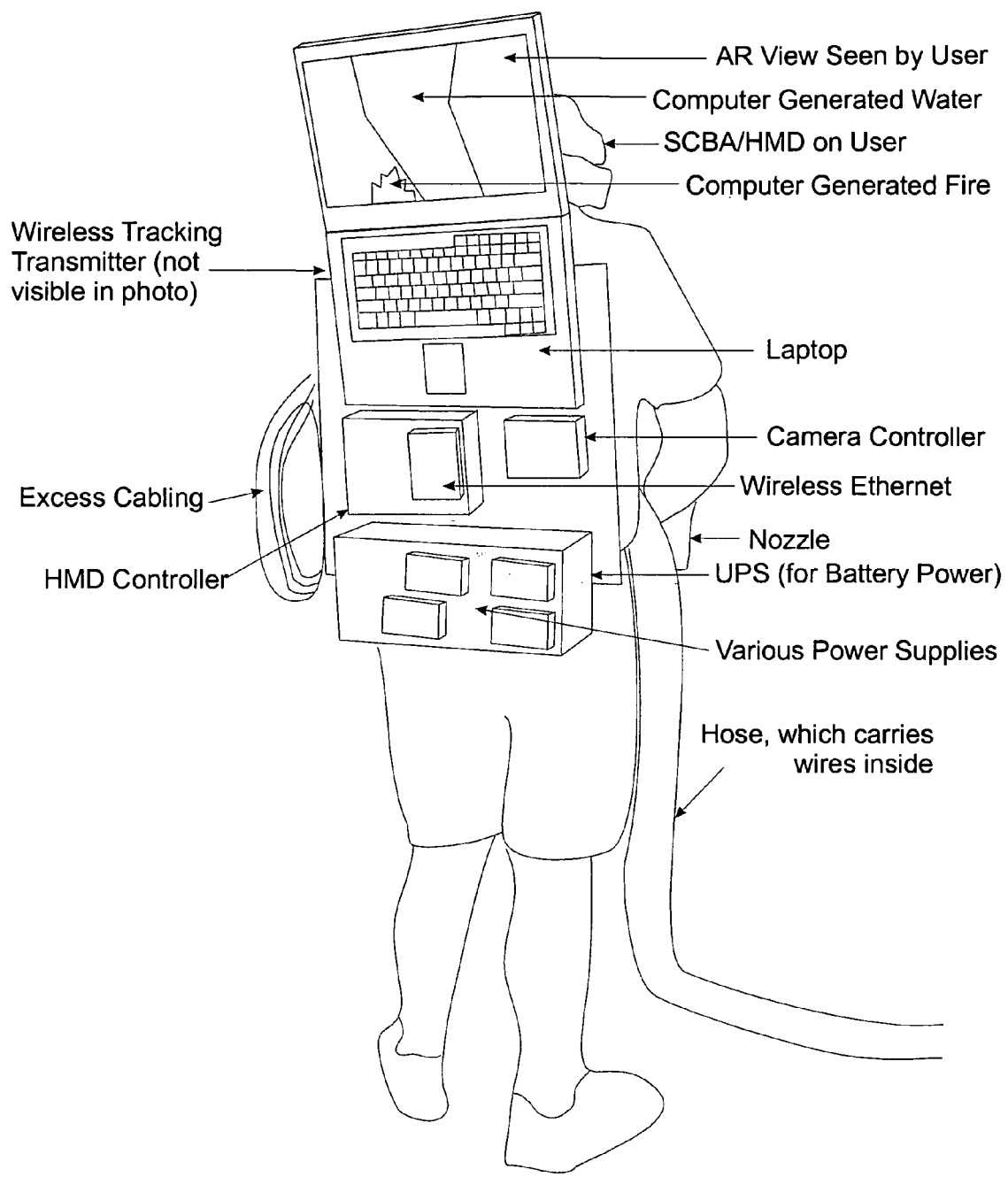
FIG. 11 shows the components used in a prototype version of arrangement E of the invention. The user is using the system and operating a nozzle (which is attached to a hose, and is not wireless).
Figure 12:
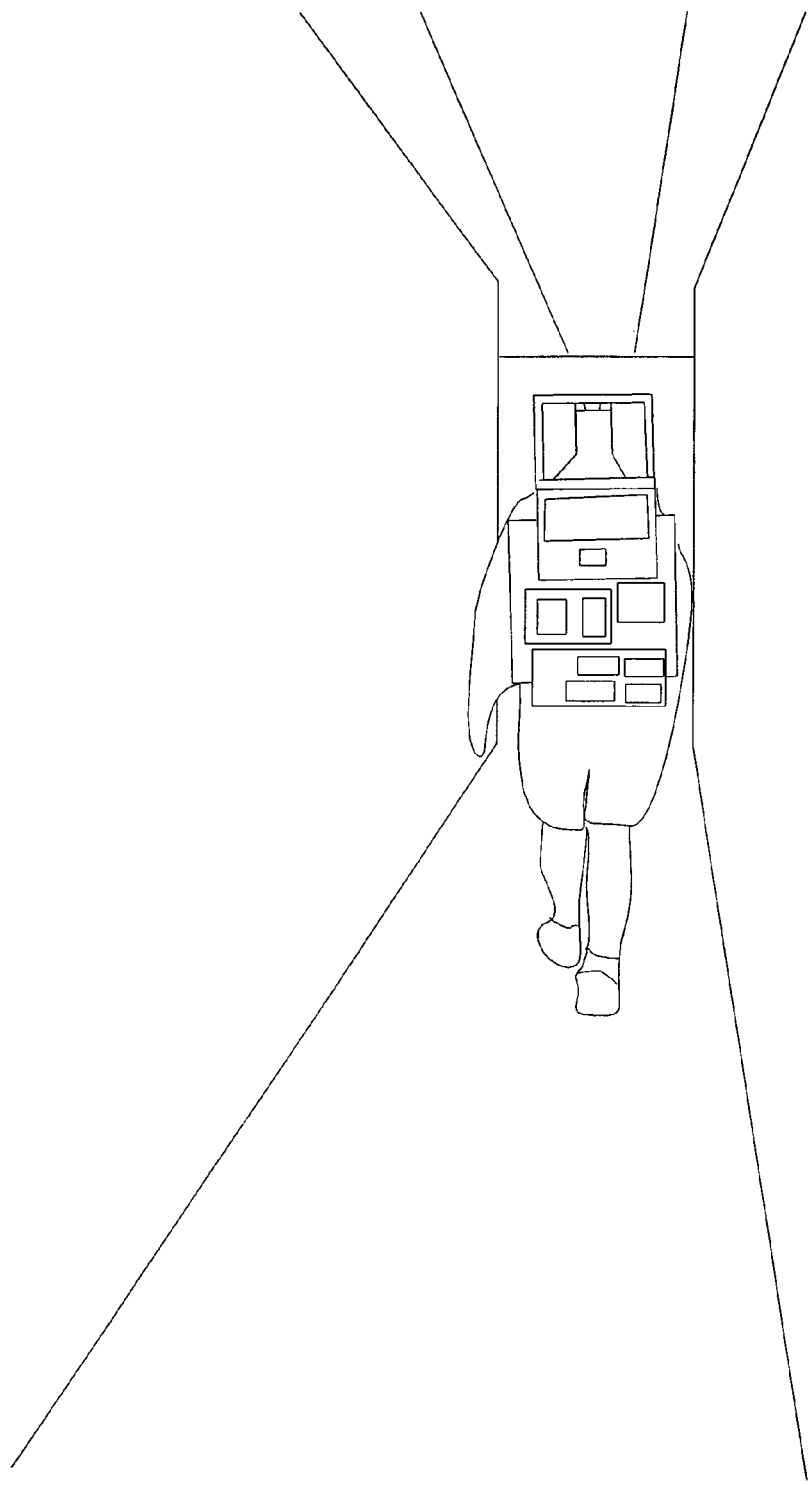
FIG. 12 shows the same components, with the user walking down the hallway, operating wirelessly, and able to see the hallway (the picture on the laptop is what the user sees).
Figure 13:
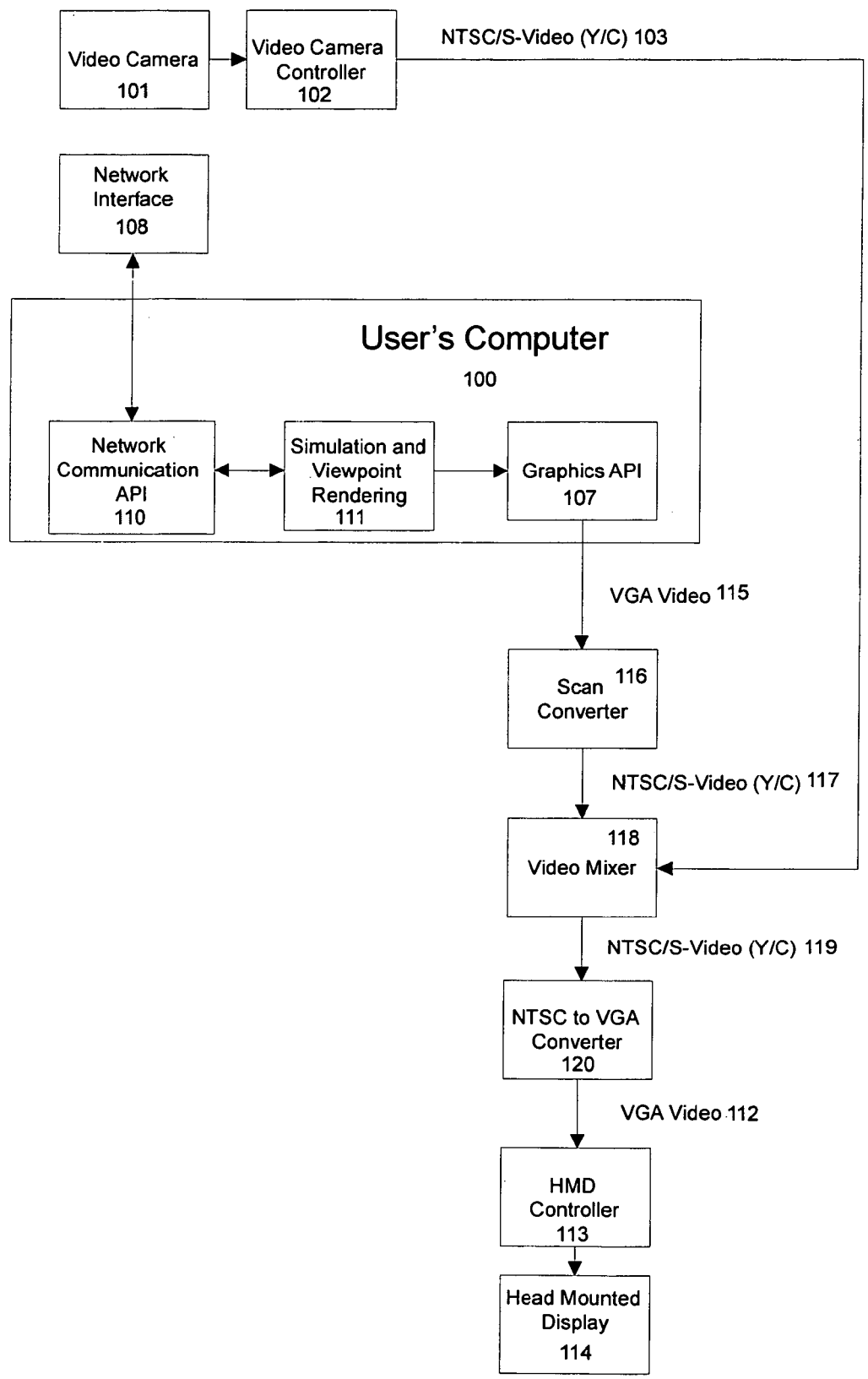
FIG. 13 shows the data flow and software functions when using hardware-based video mixing (arrangements A, B, C, and D).
Figure 14:
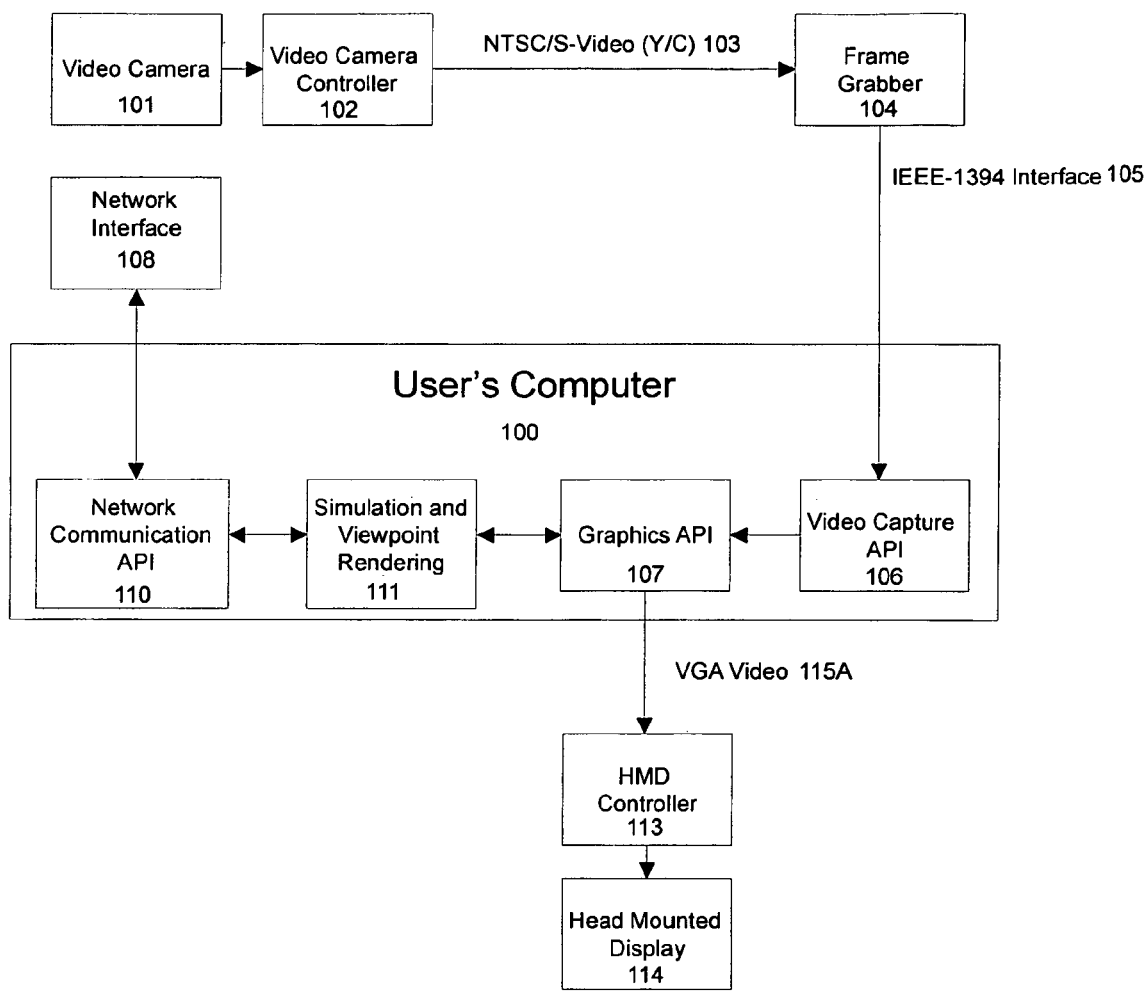
FIG. 14 shows the data flow and software functions when using software-based video mixing (arrangements E, F, and G).

FIGS. 11 and 12 show an actual reduction to practice of an arrangement E system in use. In FIG. 11, the user is carrying an instrumented fire hose and nozzle that the user is controlling to emit a virtual water stream that interacts with the virtual fire and smoke. The equipment is using arrangement E (except for item 29; separate power supplies were instead used for each item). The user is operating a nozzle (which is not wireless) and fire hose, putting out a fire. FIG. 12 depicts the wireless system carried by the user, and the user is walking down the hallway, operating wireless, and able to see the hallway (the picture on the laptop is what the user sees).

Figure 9:
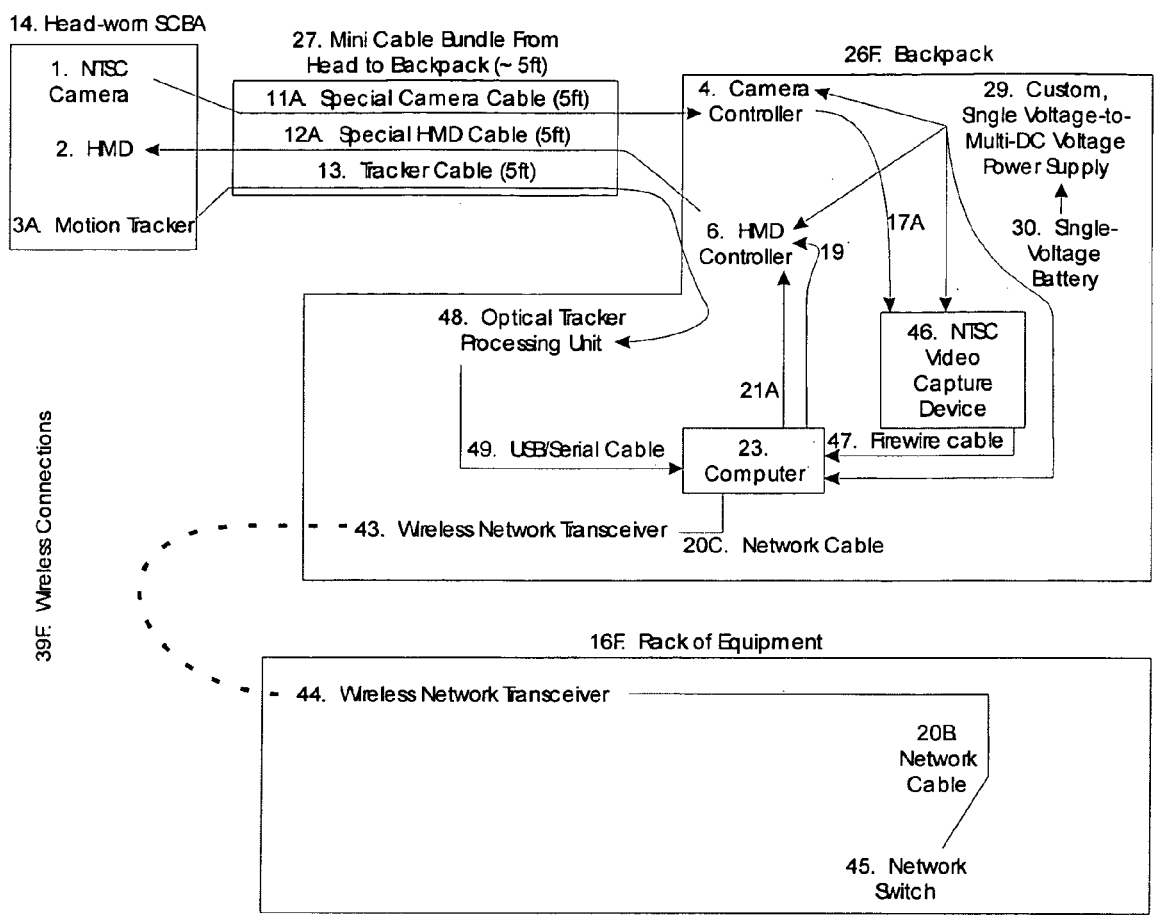
FIG. 9 shows the hardware layout of arrangement F of the invention, with no tether (wireless) and a backpack.

Arrangement F. See FIG. 9.

This arrangement is somewhat similar to arrangement E above, but with a passive tracking technique, preferably an optical tracker.

To describe this arrangement, view in contrast to arrangement E. Take arrangement E described above, and change the motion tracker 3 to be a passive optical tracker 3A. By passive, we mean that it views the environment to determine position. There is no communication from the head-worn tracker 3A to any equipment on the rack of equipment 16F (which is unlike the other techniques). By contrast, an active optical tracker would tell the rack of equipment 16F what it sees, and then let the rack of equipment 16F compute the position of the motion tracker 3A. Then that tracking information would have to be sent to the computer 23. Since the processing can be done on the backpack 26F inside the optical tracker processing unit 48, the backpack 26F can be more self-contained, requiring only an external network connection to communicate with other computers.

A passive motion tracker 3A described here could be a system such as the InterSense IS-1200, which uses a camera (not shown) and inertial sensors (not shown) to capture images of flat targets (not shown) that are placed in the environment. Then a backpack 26F worn optical tracker processing unit 48 determines the position of the tracker 3A relative to the flat targets, and is connected to the computer 23 via a USB or serial cable 49 (or other type of cable) to tell the computer 23 what the motion tracker's 3A position is.

The main advantage is that only one wireless connection 39F remains—the wireless network to communicate with other users' computers 23, or a master computer (not shown). This is a tremendous benefit, since wireless networking is very well researched. Additionally, just like arrangements E and G, this arrangement is completely scalable, and the rack of equipment 16F needs no hardware modifications to expand the number of users.

The disadvantages are that is has a slightly bulkier backpack 26F and head-worn SCBA 14, and it probably uses more power by the computer 23 and video capture device 46, than the hardware used in arrangement E.

Figure 10:
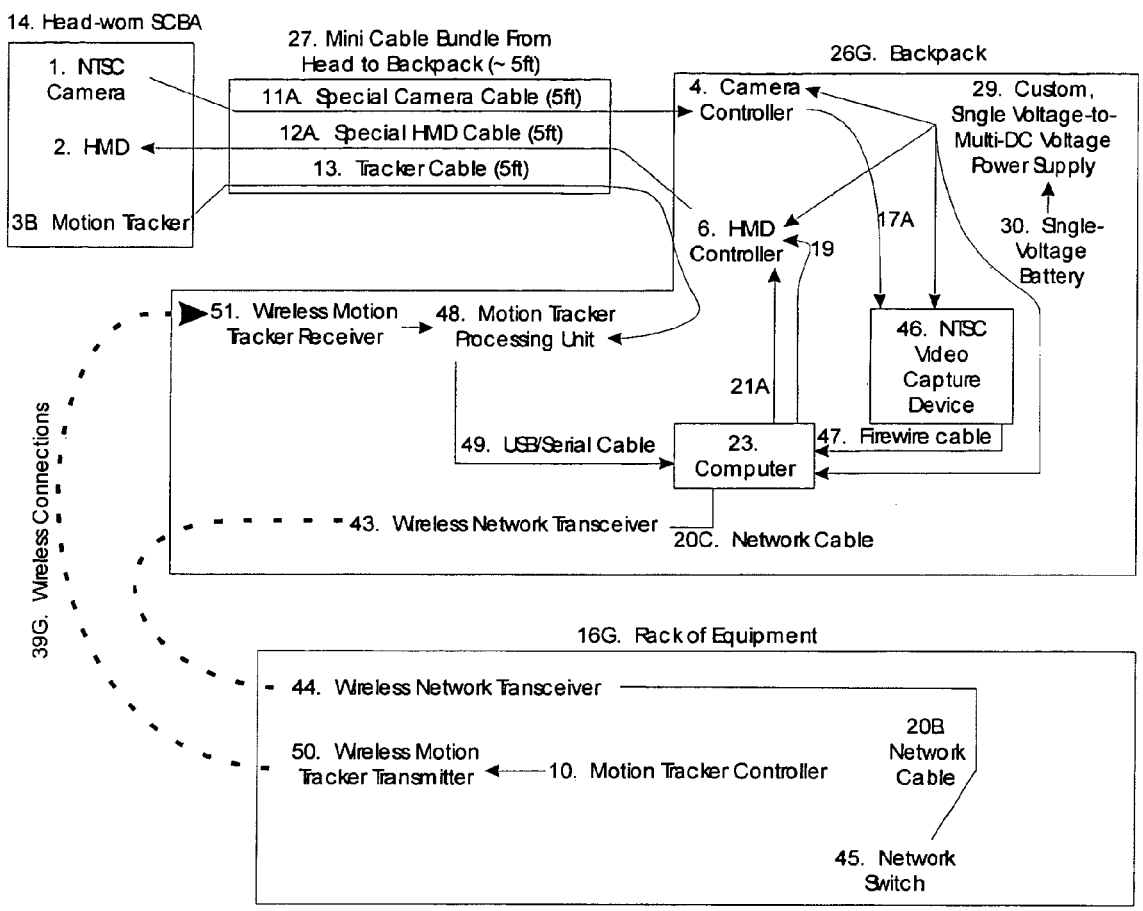
FIG. 10 shows the hardware layout of arrangement G of the invention, with no tether (wireless) and a backpack.

Arrangement G. See FIG. 10.

This arrangement is somewhat similar to arrangement F above, but with a semi-active tracking technique, with another alternate hardware design.

To describe this arrangement, view in contrast to arrangement F. Take arrangement F described above, and make the below changes.

Change the motion tracker 3A to a semi-active tracker 3B. This semi-active tracker 3B could be based on any kind of tracking technology, such as acoustic, optical, or magnetic. The important concept is that some of the computing is done on the backpack 26G, and a base station is "broadcasting" to all users which of the active fiducials are "chirping" or "flashing" at that moment. For the below discussion, assume that an IS-900 tracking system is used, with ceiling-mounted speakers (the fiducials), which "chirp." Normally, most trackers will "chirp" a certain fiducial, and based on what the trackers hear/see combined with the timing of the event, can determine the location of the motion tracker 3B. However, in this situation, the motion tracker controller 10 broadcasts what and when a fiducial is chirping, and allows all units receiving that timing information to evaluate the tracking data onboard, and then provide the completed tracking position and orientation information directly to the Computer 23.

Advantages are numerous. Since the computer 23 receives direct tracking information, the computer 23 does not need to wait for the information to go to a motion tracker controller 10 (via a wireless connection) and then back to the computer 23 (via another wireless connection). Thus, it provides faster and more reliable tracking information, with less lag, or less algorithmic prediction required. It can allow a system like the 3rdTech active optical system (which uses strips of LEDs mounted on the ceiling that flash, and an optical camera-type tracker which sees them) to be wireless because of the low latency encountered in the one-way wireless communication. Just like arrangement F, this arrangement is 100% scalable, and the rack of equipment 16G needs no hardware modifications to expand the number of users. Unlike the wireless tracking technique of the preferred embodiment, which uses a wireless motion tracker transmitter 31 (see FIGS. 5 through 8) for each user (and one wireless channel for each user as a result), this technique only uses a single, unidirectional wireless motion tracker transmitter 50. The significance is that as the number of users increases, there is no additional concern of wireless interference problems and it is 100% scalable. Also, unlike the preferred technique using wireless motion tracker transmitter 31, which is actually bidirectional since the wireless motion tracker transmitter 31 indicates connection status with the wireless motion tracker receiver 32, thereby increasing bandwidth load. In arrangement G, the wireless tracker transmitter 50 transmits the same amount of information whether one user or a hundred users are being tracked.

There are several possible disadvantages of this arrangement. The motion tracker controller 10 doesn't know where the motion tracker 3B is (unless it is transmitted from the computer 23), and thus won't be able to optimize the chirping/flashing patterns. This is likely to be a custom modification. This arrangement is not suitable for wireless items like wireless extinguishers, unless they also have a wireless network transceiver, since the main purpose of tracking those devices is so that other devices (like the software running on computer 23) know where they are, so that they can be properly accounted for in the simulation.

Additional Notes and Commentary

Motion Tracker Controller Notes:

The motion tracker controller 10, in the embodiment in which it is an InterSense IS-900, cannot itself be made wireless since it needs to be wired to the tracking equipment mounted in the ceiling, but individual trackers can have wireless connections to it.

Battery Notes:

The batteries need a method of charging. A charging unit may or may not be mounted onto the backpack, depending on design. Since this field is well established, no other commentary is necessary—a suitable choice should be made for a battery charger depending on the battery chosen.

Batteries may be backpack worn, belt worn, vest worn, or any other suitable carrying means may be chosen.

Video Notes:

Anywhere the format "NTSC" is specified, "PAL" or "HDTV" can just as easily be used, and should be considered as encompassed in the invention, as well as any other video format, though at the time of this invention these were the most obvious kinds of video. The actual video format used depends on the ultimate capabilities of the head-mounted display, computer system, video mixer hardware, and other hardware components, plus the desired fidelity. The components described in the embodiments were judged to provide good enough fidelity, while keeping costs down.

Also, NTSC video mixers have been described, but other kinds could be used, such as a native VGA (or PAL or HDTV) mixer. This would allow for higher resolution mixing, since the laptop could send VGA directly to the mixer, and then allow the mixed VGA signal to go directly out to the HMD controller (the one selected natively takes VGA), instead of going out as NTSC, and then having to go to a NTSC-to-VGA converter.

Some wireless video transmitters can include audio, thus saving additional transmitters/receivers, and reducing bandwidth requirements. For example, broadcast TV channels (like VHF/UHF) always include audio, and there are currently available 2.4 GHz wireless video systems that include audio. But to be explicit, the diagrams in this patent application include separate audio transmitters both in case these transmitters are needed, plus to remind the reader that audio does need to reach the head worn system in the application. However, audio may not be needed for some applications.

Other Commentary:

The nozzle shown the photographs is the wired (tethered) version that is normally used. It has at least one cable running down the hose to the rack of equipment, and this cable connects normally to the motion tracking equipment, and possibly the computer directly (depending on which version). The current version plugs only into the motion tracking equipment, and it also is able to read the settings of the nozzle's moving parts that adjust the computer-generated display of the water flow and pattern, which the simulation software needs to know. The nozzle is wired because it has been determined that there is normally no reason to make it wireless, and since wireless is much more expensive, and lower performance, wired is the preferred choice. However, the invention encompasses a wireless nozzle version too, which may be useful if the rack of equipment is very far away. Also, future implementations include wireless extinguishers such as $CO_2$, AFFF, and PKP extinguishers. These should normally be wireless, though wired may be used, if reasonable, due to cost and performance tradeoffs.

One of the benefits of making the systems backpack worn is that they are much more readily scalable, since adding more users may not require adding more hardware to the rack of equipment. This is especially true for arrangements D and E, which have every user-specific (also known as SCBA/HMD-specific) component mounted onto the backpack.

The equipment described herein may easily be adapted to purposes other than firefighter training. By changing the software alone, police or military personnel could train with these backpack-worn units. Enhancements could readily be made by replacing the nozzle/hose with a handgun or rifle, and possibly mounting the HMD/Camera/Tracker onto a face piece or head-worn unit other than an SCBA. Further, the unit could be made into a video-game type of system such as a first-person "shoot-'em-up" format kind of game.

The new video-capture hardware techniques in arrangement E could be applied to all other arrangements, including the prior art. In the instance of the prior art, the rack of equipment would be implemented using the video capture device 46 instead of the video mixing hardware 22. Most else would be the same. The video capture device 46 technique of arrangement E could have been used to create versions of the prior art and arrangements A1, A2, A3, B, and C (arrangement D is not included since arrangement E is already the video capture version of arrangement D), but for simplicity these additional 6 diagrams are not included herein.

Uses for Emergency First Responder Training (e.g., Firefighters)

Using the inventive augmented reality system, emergency first responders can encounter, and interact with, dangerous situations like flashover in their own locations—without exposure to real hazards. Semi-empirical and physics-based models are used to create computer-generated hazards (such as fire, smoke, and toxic gases) superimposed onto, and anchored to, the real world. This permits the first responder to see and interact with these hazards, such as extinguishing a fire or conducting search & rescue in thick black smoke. The trainee can also "see" and respond to otherwise invisible hazards, including colorless gases and radioactivity. Applications include:

Fires, including realistic smoke and extinguishing, and flashover

Chemical spills or biological contamination

Nuclear/radiological accidents

Poison gas incidents/terrorist attacks

HAZMAT (hazardous materials), weapons of mass destruction

Portable or Wireless Extinguishers

It is likely that a simulator, such as for firefighting, would want the trainees to use additional equipment, such as extinguishers. Two main types of extinguisher accessories are envisioned: (1) portable extinguisher bottles, including, $CO_2$, PKP, AFFF, and any other sort of hand-held, compressed bottle format extinguishers, and (2) regular water/AFFF hand-held nozzles that are connected to a water/AFFF source via a hose.

In both cases, it is envisioned that either type could be instrumented with electronics to read in both the settings of the device and a position tracker to obtain the 6DOF position of the extinguishing device. The instrumentation could be made to have a wireless connection to the main rack of equipment 16, or could be made tethered.

Discussions of the Simulation as a Whole

The motion tracking hardware used can be performed by any single tracking system or combination of tracking systems that can provide position and orientation of an object. Examples include inertial/acoustic systems, such as the InterSense IS-900, optical systems, such as the InterSense IS-1200 or 3rdTech HiBall, or a hybrid system, such as a coupled inertial RTK (Real-Time Kinematic) GPS (Global Positioning System) and compass.

Similarly, user interaction can be facilitated with nearly any device, including explicitly tracked devices (using motion tracking hardware), implicitly tracked devices (using computer vision or similar techniques to localize a device spatially), or untracked devices (if spatial positioning isn't required for the interaction). User interaction can also be facilitated through other methods with which there is no physically manipulated device, including gesture recognition and voice command.

Other systems participating in the simulation can be full systems worn by a user (including a display, tracking hardware, and other components to permit complete interaction with the AR synthetic environment) as well as non-user systems. Non-user systems can include stationary display systems (such as a surveillance-type camera with embedded AR, used for distance learning), simulation/computation systems (used to perform large-scale simulation calculations, and transmitting the results to the participating systems for display, to offload computational requirements from the portable systems), statistics collectors, or sensor systems (used to monitor objects or locations in the environment, including contact pads, motion detectors, switches, and other devices with which the users are intended to interact). So long as the systems can communicate with one another over a data communications network, they may all share information and simulation parameters to create a rich and highly interactive environment.

The computer-generated visual elements of the synthetic environment can be abstract information (such as textual or primitive graphical elements, such as architectural or scientific information) or a photorealistic representation of the environment (such as fire or smoke), or any combination of those elements Creating a visually combined display for the user can be done in numerous ways. It can be done optically (for example, using a prism or partial mirror), using a camera and video mixing hardware (such as chrominance or luminance mixing or keying), using a camera and software mixing (by using video capture hardware and displaying the real world video input as part of the rendering of the synthetic environment), or by environmental projection (projecting the view onto the real environment, for example, with lasers, LCD, or DLP projectors). The information can also be superimposed by using a retinal display (such as the Microvision Nomad).

Output of the system can also comprise non-visual stimuli. Auditory cues can be simulated by the system and presented to the user as three-dimensional sound in a set of headphones. Tactile cues can be simulated and presented via haptic force-feedback systems. Even olfactory and taste cues could be simulated by the system and presented to the user through an appropriate sensory stimulator.

The data communications system can be any system over which all desired participants can communicate effectively with minimal latency and sufficient bandwidth to communicate all information required to share the synthetic environment. One solution is to use wireless Ethernet standards, such as 802.11a, 802.11b, or 802.11g for all systems to communicate. This provides a flexible, cross-platform method so that virtually any modern computational system can communicate with high bandwidth and low latency over extended distance without cables.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A method for accomplishing a scalable, multi-user, extended range, distributed, augmented reality environment, comprising:

providing a head-worn display unit;

providing a computer system and video hardware worn by the user;

providing a data communications system worn by the user to permit the computer to communicate with other computer systems;

providing motion tracking hardware worn by the user;

using the motion tracking hardware to determine the position and orientation of the user's viewpoint;

using the data communications system to send or receive current user position, simulation modification command made by users or instructors, and computer-driven simulation status to other systems participating in the environment;

using the computer system to simulate a synthetic environment comprising graphical elements;

using the computer system and video hardware to render the graphical elements corresponding to the user's viewpoint; and creating for the user a mixed view comprised of an actual view of the real world as it appears from the user's viewpoint, where graphical elements can be placed any place in the real world and remain anchored to that place in the real world regardless of the direction in which the user is looking, wherein the rendered graphical elements are superimposed on the actual view, to accomplish an augmented reality view of the simulated environment.

2. The method of claim 1 in which the environment is a firefighter training environment, and a simulated fire may be extinguished by the user, comprising:

specifying that the environment be a firefighter training environment;

providing a physical device that the user can operate to simulate applying extinguishing agent, the device carried by the user during firefighter training;

providing motion tracking hardware attached to the extinguishing agent application device;

using the motion tracking hardware that is attached to the extinguishing agent application device to determine the position and orientation of the extinguishing agent application device;

determining the operating state of the extinguishing agent application device;

transmitting the position, orientation, and operating state of the extinguishing agent application device to other systems participating in the firefighting environment; and using the position, orientation, and operating state of the extinguishing agent application device to generate graphical elements comprising simulated application of an extinguishing agent, showing the extinguishing agent itself emanating directly from the extinguishing agent application device, and showing the interaction and extinguishing of fire with the agent.

3. The method of claim 2 where the extinguishing agent application device is selected from the group consisting of a water nozzle, AFFF nozzle, PKP extinguisher, CO2 extinguisher, and AFFF extinguisher.

4. The method of claim 2 where the extinguishing agent application device is operated wirelessly.

5. The method of claim 1 in which the environment is a police or military training environment, comprising:
specifying that the environment be a military-style training environment;
providing a physical device that the user can operate that simulates the functionality of a gun, which is carried by the user during training;
providing motion tracking hardware attached to the physical device;
using the motion tracking hardware that is attached to the physical device to determine the position and orientation of the device;
determining the operating state of the device;
transmitting the position, orientation, and operating state of the device to other systems participating in the environment; and
using the position, orientation, and operating state of the device to generate graphical elements comprising simulated gunfire, and showing the results of the gunfire on elements in the simulation.

6. The method of claim 1 in which a tether is used to connect at least some of the user-worn equipment to a remotely-mounted set of equipment to provide at least one of power and data to the user-worn equipment.

7. The method of claim 1 in which at least one battery is carried by the user, to provide power for at least some of the other equipment carried by the user.

8. The method of claim 1 in which the power used by the various user-worn items is generated on the user, from a single power source provided over a tether connected between the user-worn items and a remote location.

9. The method of claim 1 in which at least one power supply creates at least one voltage output.

10. The method of claim 1 in which the unit is operated wirelessly, and has no tether.

11. The method of claim 10 in which the equipment worn by the user transmits tracking data and video data to a remote location, and the necessary computer-generated imagery is created and mixed with the video data at the remote location, and then the mixed augmented reality video is transmitted back to the equipment worn by the user for display to the user.

12. The method of claim 10 in which the equipment worn by the user transmits tracking data to a remote location, and the necessary computer-generated imagery is produced at the remote location and then transmitted back to the equipment worn by the user, and the equipment worn by the user mixes the computer-generated imagery with the video created by the video hardware worn by the user, thus generating the finished augmented reality video for display to the user.

13. The method of claim 10 in which the equipment worn by the user transmits tracking data to a remote location, and tracking position data is computed at the remote location and then transmitted to the equipment worn by the user, and the equipment worn by the user produces the necessary computer-generated imagery, and mixes the computer-generated imagery with the video created by the video hardware worn by the user, thus generating the finished augmented reality video for display to the user.

14. The method of claim 13 in which the video created by the video hardware worn by the user is captured by the computer worn by the user, and then the computer mixes the computer-generated imagery with the video.

15. The method of claim 10 in which the equipment worn by the user performs all necessary processing of video data and tracking data, without the assistance of any remote computer hardware.

16. The method of claim 1 in which software-based video mixing is performed, where the computer captures a video stream, renders computer-generated simulation components, mixes them with the video stream, and then outputs the completed augmented reality video stream.

17. A method of tracking a user, in which equipment worn by a user performs user-tracking processing, comprising:
providing active motion tracking hardware installed in the environment;
providing motion tracking hardware worn by the user which is able to receive signals from the active motion tracking hardware installed in the environment, and those signals contain information about the relative position of the motion tracking hardware worn by the user in relation to the active motion tracking hardware installed in the environment;
providing motion tracking data processing hardware worn by the user which processes the signals received by the motion tracking hardware worn by the user;
providing a means for the motion tracking data processing hardware to receive information about the signals of the active motion tracking hardware installed in the environment, where the information at least indicates when the motion tracking hardware installed in the environment is emitting a signal; and
using the motion tracking hardware and additional motion tracking data processing hardware to determine the position and orientation of the user's viewpoint in relation to the motion tracking hardware installed in the environment.

18. The method of claim 17 in which the means to receive said information about the signals of the active motion tracking hardware installed in the environment is accomplished with a wireless link.

* * * * *